A. R. SHAFFER.
GRAIN DRILL.
APPLICATION FILED JUNE 6, 1917.

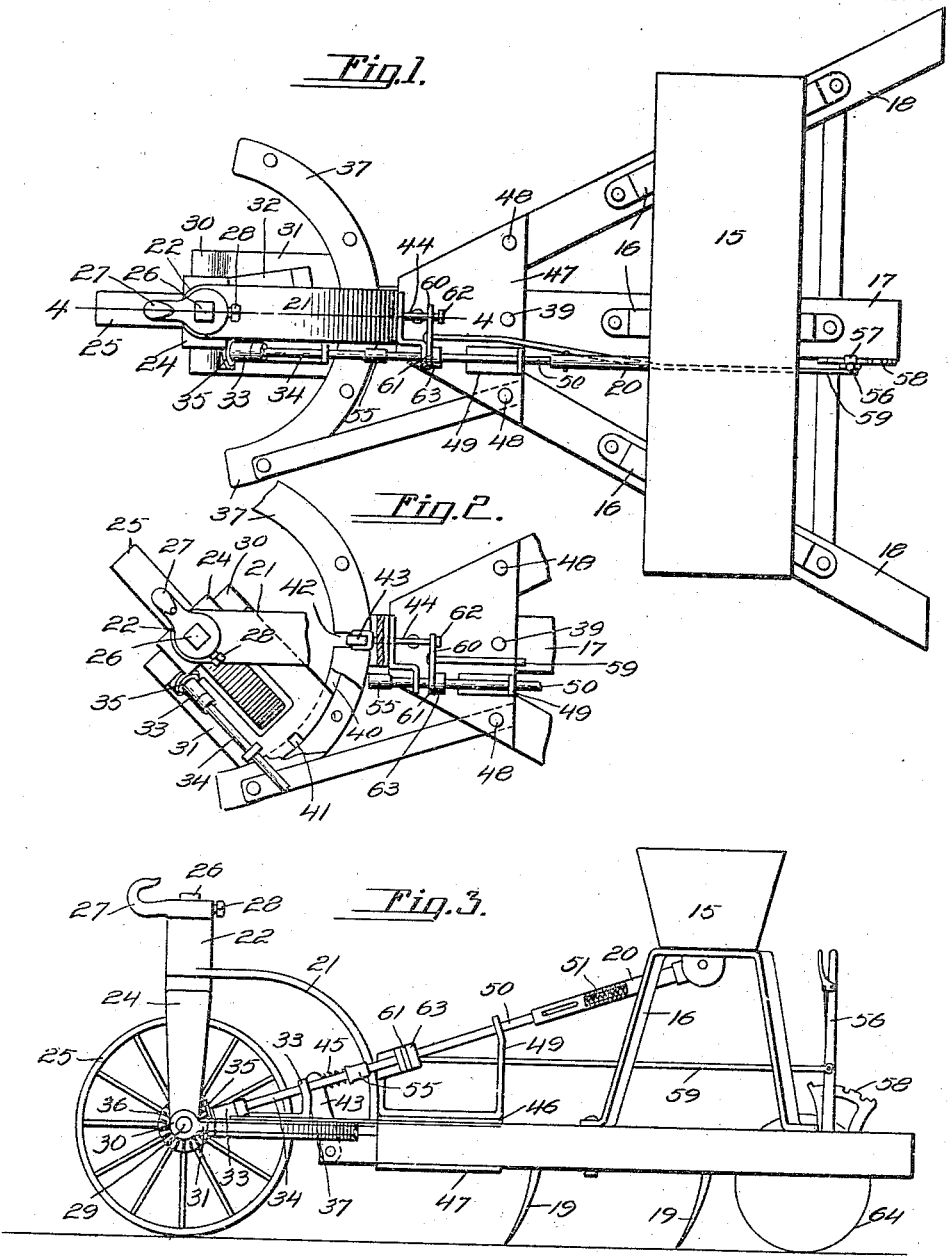

1,243,560.

Patented Oct. 16, 1917.
2 SHEETS—SHEET 2.

WITNESSES
F. C. Gibson,
Eva W. Springer.

INVENTOR
Allen R. Shaffer.
BY Victor J. Evans
ATTORNEY

UNITED STATES PATENT OFFICE.

ALLEN R. SHAFFER, OF HOLBROOK, NEBRASKA.

GRAIN-DRILL.

1,243,560.

Specification of Letters Patent. Patented Oct. 16, 1917.

Application filed June 6, 1917. Serial No. 173,195.

*To all whom it may concern:*

Be it known that I, ALLEN R. SHAFFER, a citizen of the United States, residing at Holbrook, in the county of Furnas and State of Nebraska, have invented new and useful Improvements in Grain-Drills, of which the following is a specification.

This invention relates to grain drills and it has particular reference to the guiding and operating mechanism of this class of devices.

One object of the present invention is to provide simple and improved means for guiding the apparatus and for enabling the same to turn sharp corners.

A further object of the invention is to simplify and improve the means for transmitting motion from the driving wheel to the operating shaft of the drill.

A further object of the invention is to produce simple and improved means whereby the ground wheel carrying fork, which is normally locked to retain the ground wheel in alinement with the frame of the machine, may be unlocked so as to permit steering movement of the wheel.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Figure 1 is a top plan view of a grain drill constructed in accordance with the invention.

Fig. 2 is a similar view showing the ground wheel turned for steering purposes.

Fig. 3 is a side elevation.

Corresponding parts in the several figures of the drawings are denoted by like characters of reference.

Figure 4:
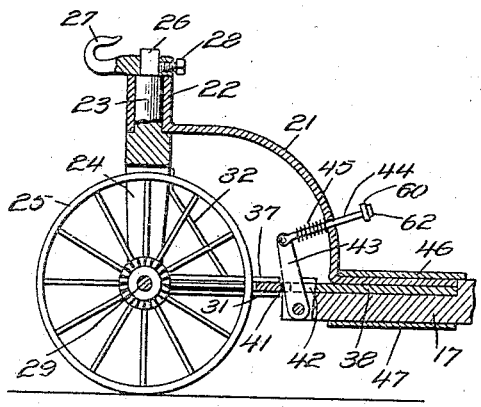
Fig. 4 is a longitudinal sectional detail view taken on the line 4—4 in Fig. 1.
Figure 5:
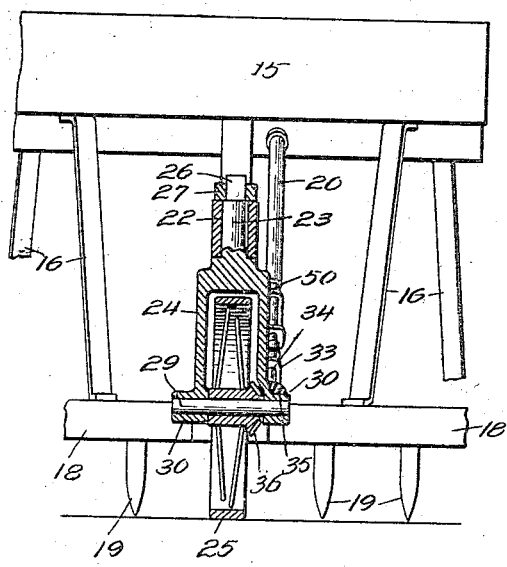
Fig. 5 is a transverse sectional view taken through the ground wheel and the carrying fork.
Figure 6:
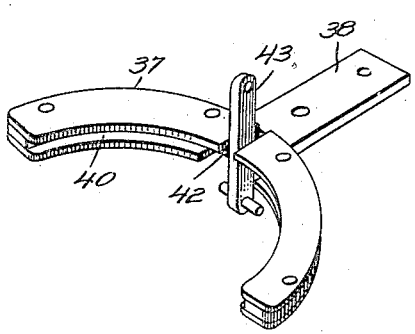
Fig. 6 is a perspective detail view of the arcuate guide bracket and related parts.

The box or hopper 15 of the grain drill is mounted on supports 16 rising from the center beam 17 and the rearwardly divergent side beams 18 which together constitute the frame which is equipped with the furrow openers 19. These furrow openers may be of any desired type or construction, their purpose being to prepare the ground for the reception of seed from the feed box. The seed dropping and conveying means have not been shown in the drawings as they form no part of the present invention, but a tubular shaft 20 has been shown which constitutes the operating shaft whereby the seed dropping mechanism is actuated, said shaft being supported for rotation below the bottom of the box or hopper 15.

Secured on the center beam 17 at the forward end thereof is a forwardly and upwardly extending arch member or bracket 21 on which is mounted a box or bearing member 22 for the reception of a shank or spindle 23 that extends upwardly from the fork 24 carrying ground wheel 25. The spindle 23 is revoluble in the box 22 and the other end of said spindle is squared as seen at 26 for the reception of a draft clevis 27 which extends forwardly and which constitutes a lever whereby the wheel carrying fork may be turned about the axis of the spindle 23. A set screw 28 or other similar means may be used for securing the draft clevis on the squared portion of the spindle. The axle 29 of the ground wheel 25 extends through the limbs of the fork 24 in engagement with bearings 30 at the forward ends of the limbs of a yoke 31 which extends rearwardly in an approximately horizontal plane and which is rigidly connected with the fork 24 of a brace 32. Mounted on the yoke 31 is a bearing member 33 having a shaft 34 carrying at its forward end a bevel gear 35 meshing with a bevel gear 36 on the axle 29 of the ground wheel.

Firmly secured on the forward end of the center beam 17 is an arcuate guide 37 having a rearwardly extending lock 38 for the passage of the bolts or other fastening means 39 whereby the guide is secured on the center beam. The guide 37 is concentric with the axis of the spindle 23 of the wheel carrying fork 24, and the concave face of said guide is provided with a groove 40 that receives the rearward arcuate portion of the yoke 31 which latter is thus guided and supported. The arcuate guide 37 is provided with a notch 41 which is in alinement with the central medial line of the center beam 17. The arcuate portion of the yoke 31 has a notch 42 adapted to aline with the notch 41 when the ground wheel is in alinement with the center beam. Pivoted in the notch 41 is a catch 43 adapted to engage the notch 42, thereby maintaining the yoke and related parts stationary with respect to the arcuate guide. The catch 43 is actuated by means of a rod 44 guided through the arch member 21 and having an actuating spring 45 whereby it is actuated to force the catch 43 in engagement with the notch 41.

Figure 7:
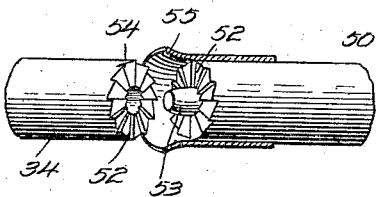
Fig. 7 is a perspective detail view showing the meeting ends of the two sections of the transmission shaft.

The forward end of the frame structure is provided with top and bottom plates 46 and 47 for the passage of fastening means such as bolts 48 whereby the center beam and the side beams of the frame structure are connected together. Supported on the top plate 46 is a bearing member 49 supporting a transmission shaft 50 the rearward end of which telescopes in the tubular operating shaft 20 with which it is connected for rotation in any well known manner. The tubular shaft also contains a spring 51 whereby the transmission shaft 50 is pressed in a forward direction in engagement with the rearward end of the driving shaft 34. The contacting end faces of the shafts 34 and 50, as will be best seen in Fig. 7, are formed with interengaging clutch ratchets 52, and one of said shafts is provided with a centering pin 53 adapted to engage a socket 54 in the other shaft. One of said shafts is also equipped with a flaring sleeve 55 which, after the shafts have been separated for the purpose hereinafter set forth, will facilitate the guiding of one in engagement with the other when restored to operative relationship.

Fulcrumed on the center beam 17 near the rearward end thereof is a hand lever 56 having a lock 57 adapted for engagement with a rack segment 58. Pivotally connected with the hand lever 56 is the rearward end of a connecting rod 59, the same having at its forward end laterally extending lugs 60 and 61, the first-mentioned lug 60 being apertured for the passage of the spring actuated operating rod 44 of the catch 43 while the lug 61 is similarly apertured for the passage of the transmission shaft 50. The operating rod 44 has a flange or stop member 62 and the transmission shaft 50 has a flange or stop member 63. These flanges or stop members are so disposed that when the hand lever is rocked in a rearward direction the stop member 63 on the shaft 50 will first be engaged by the lug 61 sufficiently to move the forward end of the transmission shaft 50 out of engagement with the rearward end of the driving shaft 34, thus interrupting the motion of the tubular operating shaft but without disengaging the catch 43 from the notch 42 in the yoke 31. By rocking the hand lever farther in a rearward direction, the transmission shaft will be farther inserted in the tubular operating shaft against the tension of the spring 51 contained therein, thereby disengaging the ends of the respective shafts 34 and 50 which were previously connected together by the sleeve 55 and at the same time pulling rearwardly the spring actuated rod 44 and the catch 43, thereby releasing the yoke 31 and permitting the wheel carrying fork to turn about the axis of its spindle 23, thereby enabling the machine to be steered in any direction.

Suitable brace rods and the like may be used wherever desired, and the ground engaging wheels to facilitate the turning of sharp corners may be provided as conventionally indicated at 64.

As will be seen from the foregoing description, taken in connection with the accompanying drawings, a simple and efficient device has been provided for guiding a grain drill, for transmitting motion from the ground wheel to the operating shaft, and for interrupting motion of the operating shaft and unlocking the steering mechanism, the device being controlled by a single hand lever.

Having thus described the invention, what is claimed as new is:

1. In a grain drill, a frame structure, a seed box mounted thereon, an operating shaft, a vertically disposed fork having an upwardly extending spindle, a bearing for said spindle, a ground wheel carried by the fork, an axle for the ground wheel extending through the limbs of the yoke, a yoke mounted on the axle, an arcuate guide for said yoke mounted on the frame of the machine, means for rocking the yoke with respect to the guide, said means including a catch and a spring actuated operating rod for the same, means for transmitting motion from the axle to the operating shaft, said means including a driving shaft and a spring actuated transmission shaft, and means for retracting the spring actuated transmission shaft and a spring actuated catch operating rod, said means including a hand lever, a connecting rod having apertured lugs engaging the transmission shaft and the catch operating rod, and stop members on said shaft and rod, said stop members being so arranged that the transmission shaft will be retracted previous to the retraction of the catch operating rod.

2. In a grain drill, a supporting frame, a seed box mounted thereon, a tubular operating shaft, a transmission shaft telescoping in the operating shaft and rotatable therewith, a spring in the tubular operating shaft whereby the transmission shaft is projected, a ground wheel, and a driving shaft actuated thereby, said driving shaft and transmission shaft having meeting ends provided with ratchet clutches, one of said shafts being provided with a centering pin and the other with a socket engaged thereby.

3. In a grain drill, a supporting frame, a seed box mounted thereon, a tubular operating shaft, a transmission shaft telescoping in the operating shaft and rotatable therewith, a spring in the tubular operating shaft whereby the transmission shaft is projected, a ground wheel, and a driving shaft actuated thereby, said driving shaft and transmission shaft having meeting ends provided with ratchet clutches, one of said shafts being provided with a centering pin and the other with a socket engaged thereby, one of said shafts being also provided with a flaring sleeve for the reception of the meeting end of the other shaft.

4. In a grain drill, a supporting frame, a seed box mounted thereon, a tubular operating shaft, a transmission shaft telescoping in the operating shaft and rotatable therewith, a spring in the tubular operating shaft whereby the transmission shaft is projected, a ground wheel, and a driving shaft actuated thereby, said driving shaft and transmission shaft having meeting ends provided with ratchet clutches, one of said shafts being provided with a centering pin and the other with a socket engaged thereby, one of said shafts being also provided with a flaring sleeve for the reception of the meeting end of the other shaft, in combination with means whereby the transmission shaft may be retracted to place the meeting ends of the transmission and driving shafts out of engagement.

5. In a grain drill, a supporting frame, a seed box mounted thereon, a tubular operating shaft, a vertically disposed fork having an upwardly extending spindle, an arch mounted on the frame and having a bearing for the spindle, a clevis forming a draft lever fixed on the spindle, a ground wheel carried by the fork, an axle for the ground wheel extending through the limbs of the fork, a yoke the limbs of which have bearings engaging the axle, a bearing member fixed on the yoke, a driving shaft supported thereby, interengaging bevel gears on the driving shaft and the axle, an arcuate guide supported on the frame and having a groove receiving the yoke, the latter being provided with a notch, a catch pivoted on the guide for engagement with the notch, a spring actuated operating rod for the catch, a transmission shaft telescoping in the tubular operating shaft, and a projecting spring for the transmission shaft whereby it is projected in the direction of the driving shaft, the meeting ends of the transmission shaft and the driving shaft being provided with interengaging ratchet clutch members.

6. In a grain drill, a supporting frame, a seed box mounted thereon, a tubular operating shaft, a vertically disposed fork having an upwardly extending spindle, an arch mounted on the frame and having a bearing for the spindle, a clevis forming a draft lever fixed on the spindle, a ground wheel carried by the fork, an axle for the ground wheel extending through the limbs of the fork, a yoke the limbs of which have bearings engaging the axle, a bearing member fixed on the yoke, a driving shaft supported thereby, interengaging bevel gears on the driving shaft and the axle, an arcuate guide supported on the frame and having a groove receiving the yoke, the latter being provided with a notch, a catch pivoted on the guide for engagement with the notch, a spring actuated operating rod for the catch, a transmission shaft telescoping in the tubular operating shaft, and a projecting spring for the transmission shaft whereby it is projected in the direction of the driving shaft, the meeting ends of the transmission shaft and the driving shaft being provided with interengaging ratchet clutch members; in combination with means including a single hand lever whereby the transmission shaft and the spring actuated operating rod may be successively retracted by a movement of said hand lever in one direction.

In testimony whereof I affix my signature.

ALLEN R. SHAFFER.

Copies of this patent may be obtained for five cents each, by addressing the "Commissioner of Patents, Washington, D. C."